United States Patent [19]

Croteau

[11] 3,987,712
[45] Oct. 26, 1976

[54] FIXTURE FOR CUTOUTS IN DRAIN TROUGHS
[75] Inventor: Paul J. Croteau, Springfield, Mass.
[73] Assignee: David A. Sylvester, Hackensack, N.J. ; a part interest
[22] Filed: June 9, 1975
[21] Appl. No.: 585,178

[52] U.S. Cl. .............................. 90/11 C; 90/12 D; 90/DIG. 3; 144/136 C; 144/144.5 R; 408/19
[51] Int. Cl.² ...................... B23C 1/20; B27C 5/10
[58] Field of Search .............. 90/11 C, 12 R, 12 D, 90/DIG. 3; 144/144 R, 144 A, 144.5, 136 C; 408/72, 19

[56] References Cited
UNITED STATES PATENTS
2,605,790  8/1952  Schwarzer .................. 144/144.5 X
FOREIGN PATENTS OR APPLICATIONS
702,918  2/1941  Germany .............................. 408/72

Primary Examiner—Othell M. Simpson
Assistant Examiner—Z. R. Bilinsky

[57] ABSTRACT

For removable attachment to a sheet metal drain trough or gutter a cutting fixture which has rigid template portion having an opening therethrough defining the size and shape of a hole to be cut through the bottom of the gutter. Pivotable brackets extending from opposite edge portions of the template adapted to clampingly engage the upper side wall portions of the gutter to hold the template snugly against the bottom of the gutter and impart rigidity to the gutter for cutting and is particularly adapted for use with a router. The invention also includes a method of using the fixture in making cutouts in drain troughs for installing downspout tubing.

6 Claims, 4 Drawing Figures

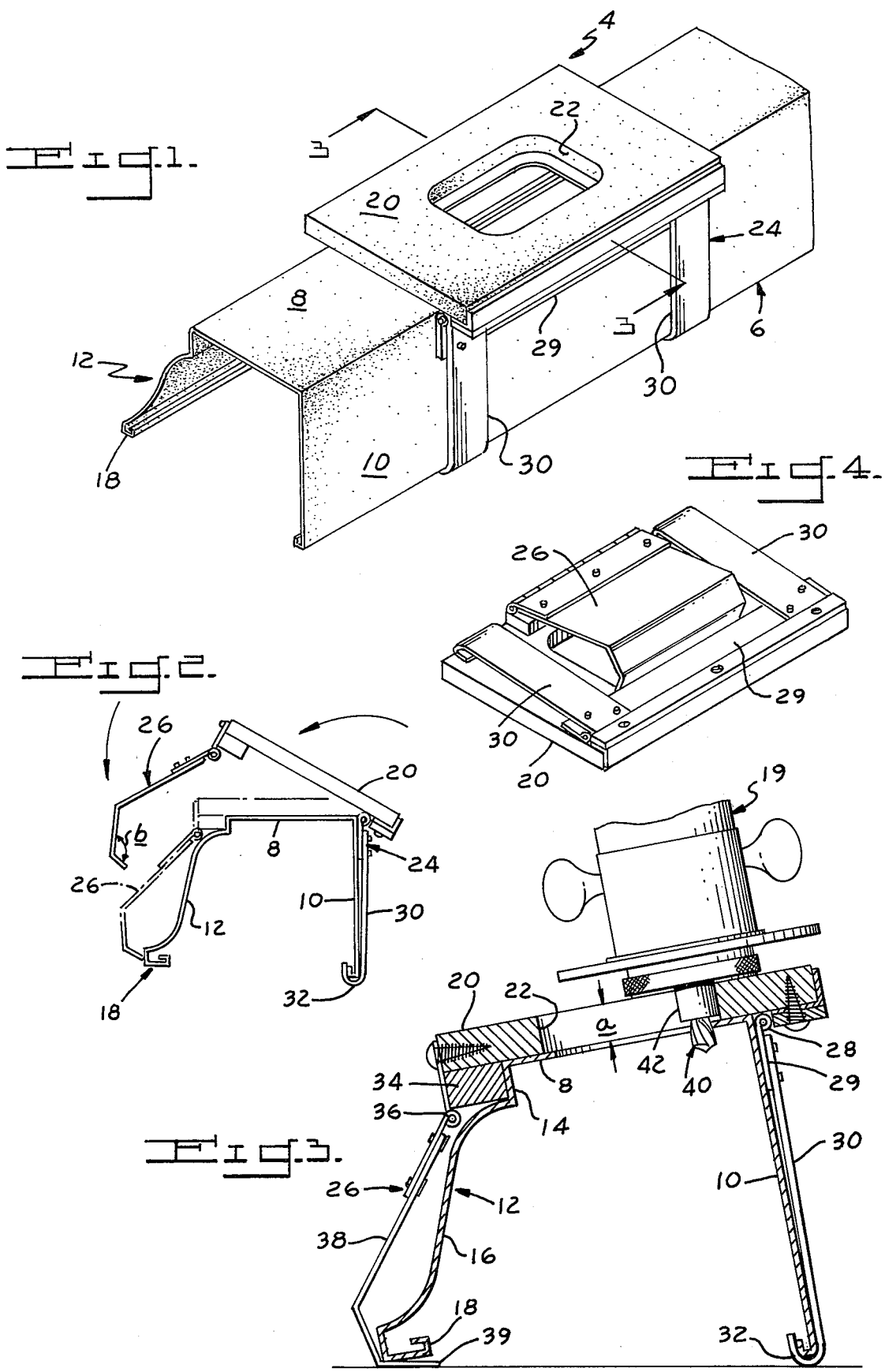

FIXTURE FOR CUTOUTS IN DRAIN TROUGHS

BACKGOUND

In recent years, sheet metal, aluminum gutter and downspout systems have had wide commercial acceptance because of their excellent appearance, durability, lack of maintenance and ease of installation. The installation includes a seamless aluminum gutter which is installed along the eaves of the house. Generally, the gutter has the cross section of an upwardly opening channel which is factory prefinished aluminum. These gutters are extremely durable, rustproof and weather-resistant and rarely require any interior or exterior painting, coating or surface refinishing as is the case with wooden gutters. Aluminum gutters are usually fabricated of thin gauge aluminum to facilitate fabrication, maintain relatively low material costs and to provide a lightweight, easy to install product. Paradoxically, the thin gauge sheet metal combined with the very flexible nature of the aluminum used for such gutters makes it difficult to achieve accurate and clean cutouts, such as required for downspout installation. Downspouts are located to carry the water from the gutter down to the ground where it is usually directed from the foundation by a precast concrete splash block. Downspouts are installed by cutting holes of desired shape and size through the bottom wall of the gutter. The downspout fitting or adaptor tube is connected so as to extend through the hole cut in the bottom of the gutter. The cutting of such holes has always been one of the more troublesome aspects of the installation of aluminum gutters. It has generally been the practice to make such holes using drills, tin snips, hack saws, jig saws or various combinations of such cutting tools. Regardless of which tool is selected, the major difficulty is caused by the tendency of the gutter to wobble and the sheet metal to bend and flex under the cutting force applied by the tool. After a hole has been cut in this manner, the edges must invariably be finished by filing to eliminate burrs and rough and uneven edges. In addition, cutting the hole to the correct size has itself been inefficient procedure involving trial and error adjustments until the downspout adaptor tube fits properly into the hole.

The principal object of this invention is to provide an improved method for making downspout cutouts in sheet metal gutters for fast, efficient, economical and inexpensive downspout installation.

Another object of this invention is to provide a novel fixture removably attachable onto the gutter which serves as both a cutting template or guide and a reinforcing support or retainer which imparts stability and rigidity to the gutter during the cutting operation.

The above and other objects and advantages of the invention will be more readily apparent from the following description and with reference to the accompanying drawings, in which:

FIG. 1 is a perspective view showing a fixture embodying this invention attached in operative position for cutting;

FIG. 2 is an end elevational view showing the gutter in which the fixture or jig is installed on the gutter;

FIG. 3 is a cross sectional view taken along line 3—3 of FIG. 1, showing the cutting tool in operation on the gutter; and FIG. 4 is a perspective view showing the fixture folded for storage or when not in use.

Referring in detail to the drawings, a fixture embodying this invention is shown generally at 4. The fixture is adapted to be removably attached to a channel shaped sheet metal drain trough or gutter shown at 6 which is being prepared for installation along the eaves of a house. Such gutters are generally factory finished aluminum sheet metal comprising a bottom wall 8, an upwardly extending generally flat or planar rear wall 10 disposed approximately perpendicular to the bottom 8 and an upwardly and outwardly stepped and curved front wall 12. The rear wall has a reversibly inturned, smoothly-rounded reinforced upper edge portion. The front wall 12 extends perpendicularly upward from the bottom 8 for a short distance forming what may be considered a riser portion 14 (FIG. 3). The riser portion and adjacent portion of the bottom wall 8 form a generally square corner. From the upper edge of the riser portion 14, the front wall extends upwardly and outwardly, first in a convex and then concave curvature in a generally ogival configuration 16. The upper edge 18 of the front wall is structurally made rigid by an inturned rectangular configuration which terminates at a lower level than the rear wall. It will, of course, be realized that the curved and stepped configuration of the front wall, imparts structural rigidity to the sheet metal forming the gutter as does the inturned edge of the rear wall.

Despite this construction, the planar wall portions 8 and 10 remain very flexible subject to bending and flexure by the application of small forces. This causes substantial difficulty in making fast and accurate cutouts through the walls of such gutters. As previously explained, the procedure and equipment heretofore available for accomplishing this apparently simple task has not been efficient and is not satisfactory for making workmanlike installations.

In accordance with this invention, there is provided an improved method and novel fixture for making cutouts in sheet metal gutters, particularly adapted for aluminum gutters. Once the location of the downspout outlet has been determined, the novel fixture 4 embodying my invention is simply and quickly snapped in place about the outer surface of the gutter, as shown in FIGS. 1 and 2. Once in place, the fixture imparts form stability and rigidity to the gutter and retains the walls thereof against flexing or deforming during the cutting operation, particularly when using a router, as illustrated at 19 in FIG. 3.

The fixture 4 considered in detail comprises a generally flat, rigid plate portion 20 with a smooth planar upper surface and a centrally located hole 22 provided therethrough. In the embodiment shown, the hole is generally of elongated rectangular configuration with the longer axis thereof disposed for alignment with the longitudinal axis of the gutter's bottom wall 8. Of course, the hole may be made in any desirable shape. The inner edge defining hole 22 forms a guide surface adapted to guide a router for making cutouts in the bottom wall of the gutter. With the fixture in place, the gutter 6 is substantially reinforced and held rigidly for the cutting operation. Preferably, the template or plate 20 is of sufficient thickness $a$ (FIG. 3) to provide a rigid support or platform and cutting guide for a router. The template may be made of any suitable material such as metal, wood, plastic or combinations of these materials. It is preferred that the plate be surfaced with a material which will not mar the factory finish of the gutter and which will provide a base for easy sliding movement of the router plate thereon and may be surfaced with a coating having a low coefficient of friction. A plate having a thickness of about ⅜in. has proved suitable as this is less than the length of a conventional router collet.

From opposite side edges of the plate 20 a pair of mounting brackets 24 and 26 extend. Preferably, each bracket is hingedly affixed to the plate 26 so both may be swung into superposed relation with the plate 20 to provide a compact unit, as shown in FIG. 4, convenient for storage and handling when not in use.

The bracket 24 includes a hinge member 28 affixed along the outer bottom edge of the template and a pair of essentially flat legs 30 extend form one plate portion 29 of the hinge for a distance approximately equal to the height of the rear wall 8 of the gutter. Each leg terminates in a generally U-shaped clamp portion 32 which fits snugly over the upper edge of this wall and yet may be easily removed after a cutting operation has been completed.

The other bracket 26 is attached in any convenient manner to a block 34 affixed to the underside of the template 20 flush with the outer edge. One plate of hinge 36 is attached to the outer surface of the block 34 and the other plate of the hinge is affixed to a bracket 26. The bracket 26 is in the form of a plate 38 having a length less than the distance between the legs 30 of the other bracket and is centrally located therebetween to enable the plate 38 to interfit between the legs 30 for compact storage in a flat condition. The plate 38 includes a generally flat or planar portion attached to the hinge 36, a second planar portion disposed at an obtuse angle, on the order of about 135°, relative to the first portion, and a third planar portion at an obtuse dihedral angle $b$ (FIG. 2) somewhat greater than 90° from the second portion. The arc or radius of movement of the bracket 26 from the hinge 36 is such that the outer end 39 of the bracket 26 will not swing over the upper edge of the front wall 12 unless flexed outwardly of the rear wall. Thus to affix the fixture onto the gutter, the side wall 12 of the gutter must be flexed to receive the dihedral corner $b$ of the bracket 26. Moreover, the upper edge 18 of the front wall 12 is captured and held by the dihedral corner $b$ of the bracket. As a result, when the fixture 4 is attached, that portion of the gutter girded by the fixture is tensioned and thereby retained in fixed form stable condition.

To attach the fixture, the U-shaped clamps 32 of legs 30 are first fitted over the reinforced upper edge of rear wall 10. The plate or template is then swung against the outer surface of the bottom wall 8 and the block 34 fitted snugly against the riser portion 14 of the front wall 12.

Finally, the upper edge of the front wall 12 is flexed outwardly of the rear wall 10 and simultaneously the bracket 26 is swung so that its dihedral angle $b$ engages and retains the reinforced upper, outer edge of the front wall. The only portion of the front wall which is contacted by the bracket is this upper corner, and consequently the factory finish of the gutter will not be marred by installation of the bracket. Moreover, the gutter portions engaged by the brackets are the rigid reinforced upper edges of the side walls and the plate 20 is urged in firm surface-to-surface contact with the bottom 8, while the block 34 and plate portion 29 of the bracket 24 reinforce the side wall of the gutter. Once the bracket is in place, the side walls and bottom wall of the gutter are firmly reinforced and may be inverted, as shown in FIG. 1, ready for cutting. The two brackets form rigid support legs for the template 20, which is in effect a small work table for the cutting operation.

Uniquely adapted for use in carrying out this method embodying my invention, is a router 19 equipped with a particular type of bit 40 having a cutting drill tip to penetrate the aluminum and the conventional flutes of the usual router bit. An example of one such bit suitable for use is ¼ Router Bit Cat. No. R 20.

Once the fixture has been attached about the gutter in the desired location and the gutter placed face down on the ground, a workbench, spaced saw horses or other suitable work support, the router 19 is started and with its collet 42 disposed against the inner edge of the cutout 22 of the template 20, the router is pressed downwardly so that the cutting tip penetrates the aluminum until the router plate engages the upper surface of the template 20. It will be noted that the thickness of the plate 20 is slightly greater than the length of the collet 42 whereby the collet clears the surface being cut. The high speed of rotation of the router bit 40 will then cleanly and rapidly cut a hole through the bottom of the gutter with the collet 42 of the router riding about the inner edge of hole 22. Very little time is required in making the hole which will have the same shape as but slightly smaller in size from the hole 22, the difference being equal to the difference between the radii of the router bit 40 and collet 42. The application of the fixture, cutting of the hole and removal of the fixture takes only a matter of a few seconds, less than 5 seconds after very little practice, and no particular training or skill is required. Thereafter, the downspout adaptor may be inserted in the hole and affixed to the gutter by drilling holes and snap riveted in place in the usual manner.

Having thus described my invention, what is claimed is:

1. Method of making cutouts through the bottom of sheet metal gutters comprising the steps of attaching to the gutter a rigid fixture which includes a generally planar template portion and mounting brackets, imparting rigidity to said gutter by affixing said fixture about said gutter with the brackets engaged with the upper edges of the side walls of the gutter and the template clamped against the bottom wall of the gutter, said template including a hole therethrough, and cutting a hole through the bottom of said gutter using a router with a cutting bit having a cutting outer tip, said router having a collet surrounding said bit, said template supporting the base of the router with the collet spaced from the bottom of said gutter when in cutting position.

2. For use in combination with a router having a base plate, a collet extending outwardly of said plate and a cutting bit extending outwardly of the outer end of said collet, said bit having cutting flutes and a cutting outer tip, a fixture for said router removably attachable to trough shaped sheet metal gutter having a bottom and generally upstanding front and rear walls each terminating in an upper edge at a predetermined height above said bottom comprising a rigid template having an outer surface which provides a support for the base plate of said router, said template having a cutout therethrough of the shape and approximate size of a cutout to be made through the bottom of said gutter, said template being of a thickness not less than the distance said collet extends beyond said base plate of the router, a pair of mounting brackets extending outwardly of opposite edge portions of the template and including means at their outer ends for removably fitting over the outer upper edges of said front and rear walls, said brackets being sufficiently rigid to support the template and router during cutting when the trough is inverted to orient the trough edges downwardly for making said cutouts, the outer ends of said brackets being disposed for contact with a supporting surface, said brackets being dimensioned to retain said template firmly against the bottom of said gutter when fitted thereon whereby the gutter is maintained in form stable condition during cutting by said router.

3. For use in combination with a router as set forth in claim 2 a fixture in which the overall length of the fixture from one clamping means to the other is less than the outer peripheral distance of said gutter measured about its bottom from the upper edge of one wall to the other whereby the gutter is held in tension when said fixture is affixed thereto.

4. Fixture for guiding a cutting tool in making cutouts in sheet metal troughs which have a bottom and generally upstanding front and rear walls each terminating in an upper edge at a predetermined height above said bottom, said fixture comprising a generally rigid planar template portion having an opening therethrough defining the shape and approximate size of a cutout to be made, mounting brackets extending from the template and including means at their outer ends for removably fitting over the upper edges of said front and rear walls, each of said brackets extending from the template a distance generally the same as the height of said front and rear walls for retaining the template firmly clamped against the bottom of the drain trough, said brackets being sufficiently rigid to support the template and cutting tool in fixed position when a drain trough with said fixture mounted thereon, is inverted to orient its upper edges downwardly with the outer ends of said brackets being disposed for contact with a supporting surface whereby downwardly forces applied to the template by the cutting tool are distributed to said brackets.

5. Fixture for guiding a cutting tool as set forth in claim 4 in which at least one of said brackets pivotably extends from generally the edge portion of said template.

6. Fixture for guiding a cutting tool as set forth in claim 4 in which said brackets extend from generally the opposite side edge portions of the template, said brackets being pivotable to and from superposed relation with the template portion of the fixture, said brackets interfitting one within the other when in said superposed relation to provide a compact unit for storage.

* * * * *